United States Patent
Mayr

[19]

[11] Patent Number: 5,919,017
[45] Date of Patent: Jul. 6, 1999

[54] EXPANSION ANCHOR

[75] Inventor: Franz-Paul Mayr, Hechenwang, Germany

[73] Assignee: Hilti Aktiengesellschaft, Schaan, Liechtenstein

[21] Appl. No.: 09/118,173

[22] Filed: Jul. 17, 1998

[30] Foreign Application Priority Data

Jul. 18, 1997 [DE] Germany ............................ 197 30 843

[51] Int. Cl.$^6$ .................................................. F16B 13/06
[52] U.S. Cl. .................................................. 411/61; 411/40
[58] Field of Search ................................ 411/55, 57, 60, 411/61, 40, 43

[56] References Cited

U.S. PATENT DOCUMENTS

| | | | |
|---|---|---|---|
| 4,002,100 | 1/1977 | Bucheli | 411/61 |
| 4,642,008 | 2/1987 | Herb | 411/61 |
| 4,690,598 | 9/1987 | Herb | 411/40 |
| 4,869,630 | 9/1989 | Revol et al. | |
| 5,765,979 | 6/1998 | Mäder et al. | |

FOREIGN PATENT DOCUMENTS

| | | |
|---|---|---|
| 0282411 | 9/1988 | European Pat. Off. . |
| 0757185 | 2/1997 | European Pat. Off. . |

*Primary Examiner*—Flemming Saether
*Attorney, Agent, or Firm*—Anderson, Kill & Olick, P.C.

[57] ABSTRACT

An expansion anchor including a sleeve-shaped anchor body (1, 21, 31, 41) having a through-bore (6, 26, 36, 46), an expansion region (4, 24, 34, 44) with longitudinal slots (5, 25, 35, 45) and a rear section (2, 22, 32, 42) provided with a load application element (3, 23, 33, 43), and an expansion member (7, 27, 37, 47) located in the through-bore (6, 26, 36, 46) and axially displaceable in the through-bore (6, 26, 36, 46) for radially expanding the expansion region (4, 24, 34, 44), with the expansion member (7, 27, 37, 47) being formed as a sheet metal stamped part having, at least regionwise, a dimension exceeding a dimension of a portion of the through-bore (6, 26, 36, 46) associated with the expansion region (4, 24, 34, 44).

12 Claims, 4 Drawing Sheets

EXPANSION ANCHOR

BACKGROUND OF THE INVENTION

1. Field of the Invention

The present invention relates to an expansion anchor including a sleeve-shaped anchor body having a through-bore, an expansion region provided with longitudinal slots and a rear section provided with load application means, and an expansion member located in the through-bore and axially displaceable in the through-bore for radially expanding the expansion region.

2. Description of the Prior Art

One of the requirements, which an expansion anchor should meet, is its easy setting. A conventional anchor, the setting of which is effected by impact expansion, meet this requirement. Such impact-setted expansion anchors have a sleeve-shaped anchor body, which is formed of steel, and an expansion member which, preferably, is likewise formed of steel, and is located in a central bore tapering in a setting direction. The expansion member is axially displaceable in the central bore. For expanding the sleeve-shaped anchor body in a bore of a receiving material, e.g., concrete, brickwork and the like, the expansion member is driven into the tapering section of the central bore by impact action acting in an axial direction. However, the conventional anchor is rather expensive in manufacture. It requires a large consumption of material, and forming the tapering bore is particularly expensive.

European Publication EP-A-0171354 discloses an expansion anchor setting of which is based on the same anchoring principle and which is characterized by a simpler manufacturing. This expansion anchor has a sleeve-shaped anchor body with an anchoring region provided with longitudinal slots, and an expansion member which is formed integrally with the anchor body and is formed as a spiral body. The expansion member is located in the central bore of the anchor body and is expanded radially by being axially upset. Due to the radial expansion of the expansion member, the expansion region of the sleeve-shaped body expands, and the expansion anchor becomes anchored in the bore. The sleeve-shaped anchor body and the expansion member are formed integrally as a one-piece part from a sheet metal stamped part. While manufacturing of an anchor from a sheet metal stamped piece has certain advantages from the manufacturing point of view in comparison with manufacturing an anchor from a massive piece of material, the anchor produced as discussed above has a certain drawback which consists in that there exist a danger of the expansion element being deformed inwardly during axial upsetting. This can result in an insufficient radial expansion of the anchor body, and the anchor would not reach the required load value.

Accordingly, an object of the present invention is to modify an expansion anchor of the type described above in such a way that the above-described drawback is eliminated, and a reliable expansion of the anchor body is insured in order to reach the required load value. At that, the expansion anchor should be capable of being produced in a simple and cost-effective manner.

SUMMARY OF THE INVENTION

These and other objects of the present invention, which will become apparent hereinafter, are achieved by forming the expansion member as a sheet metal stamped part rolled into a compact body having, at least regionwise, a dimension exceeding the dimension of the bore portion associated with the expansion region.

An expansion anchor according to the present invention includes a sleeve-shaped anchor body having a through-bore, an expansion region provided with longitudinal slots and a rear section provided with load application means, preferably in form of an inner thread. An expansion member is located in the through-bore and is axially displaceable in the through-bore for radially expanding the expansion region. The expansion member is formed as a sheet metal stamped part rolled into a compact body having, at least regionwise, a dimension exceeding a dimension of a portion of the through-bore associated with the expansion region.

Because the expansion member is formed as a sheet metal stamped part rolled into a compact body, it cannot be radially deformed when being driven into a bore in the expansion region. Thereby, it is insured that the expansion region would expand a predetermined amount, and the expansion anchor would reach a necessary load value. The expansion member behaves mechanically as a massive part and is easily and cost-effectively produced with a desired shape.

According to an advantageous embodiment of the present invention, the expansion member is formed integrally with the sleeve-shaped anchor body. In this way, the expansion member and the anchor body are formed of connected sheet metal stamped parts which influences in a particular advantageous way the manufacturing costs. Specific measures, which are usually undertaken to prevent the expansion member from falling out of the bore of the anchor body, can be eliminated because the expansion member is connected with the anchor body in a way that prevents their disconnection. A predetermined breaking point is provided in the connection region of the two parts which is sheared of upon impact-driving of the expansion member.

By folding the sheet metal stamped part, of which the anchor body is made, in the expansion region of the anchor body, the expansion region has a wall thickness greater than that of the rear region of the anchor body. This measure takes into account a greater compressive stress acting on the anchor body in the expansion region. By folding of the sheet metal stamped part in the expansion region, the diameter of the bore in the expansion region is reduced in comparison with the bore diameter in the rear region. This is achieved by folding the sheet metal part inward. The diameter of the bore in the expansion region can be further reduced by radially compressing the expansion region.

In one embodiment of the invention, the expansion member has a substantially cylindrical shape. The outer diameter of the expansion member usually exceeds the diameter of the bore in the expansion region by 0.5÷1.5 mm. With the selected diameter ratio, the driving forces and the reachable load value are proportional to each other.

Because of the tapering profile of the bore in the expansion region, the largest expansion forces act on the bore wall in the deepest region of the bore. In the regions adjacent to the upper surface of a structural component, only very small forces or no forces at all occur. Thereby, the material of the structural component is protected, and breaks-down in the upper region is prevented. From the manufacturing point of view, the tapering of the bore is particularly easy effected by stamping of the folded section of the sheet metal part before rolling.

According to an embodiment of the present invention, the expansion member has, at least regionwise, an outer profile tapering in the setting direction. The advantage of the expansion member having a tapering outer profile member with a conical outer profile consists in that it can be more easily driven into the bore in the expansion region of the anchor body, which has a smaller diameter.

To facilitate the driving of the expansion member in the bore in the expansion region, a conical slip portion can be formed in the bore in the transition region between the rear section and the expansion region of the anchor body.

The expansion member can have, at its side adjacent to the load application means, a centrally projecting tenon. In a high-strength concrete, the frictional resistance between the inner wall of the bore and the expansion member exceeds the frictional resistance between the coils of the compact-rolled expansion member. As a result, the tenon will be driven into the compact-rolled expansion member. This reinforces the front, in the setting direction, region of the expansion member. By impacting the tenon, the setting tool can be driven into the anchor body a necessary amount and can provide the end surface of the anchor body with a necessary marking.

According to an advantageous embodiment of the invention, the anchor body has, in its expansion region a substantially triangular outer contour with convexly curved outer sides divided by axial slots in expansion sections. This geometry is advantageous for adapting the anchor to the bore geometry. For achieving a stable anchoring, it is advantageous when the axial length of the expansion member is equal to the entire length of the anchor body reduced by an axial length of the inner thread. With the selected dimension ratio between the expansion member and the anchor body, the necessary bore depth can be optimized, and the entire expansion member is used for anchoring the expansion anchor.

BRIEF DESCRIPTION OF THE DRAWINGS

The features and objects of the present invention will become more apparent, and the invention itself will be best understood from the following detailed description of the preferred embodiments when read with reference to the accompanying drawings, wherein.

DETAILED DESCRIPTION OF THE PREFERRED EMBODIMENTS

Figure 1:
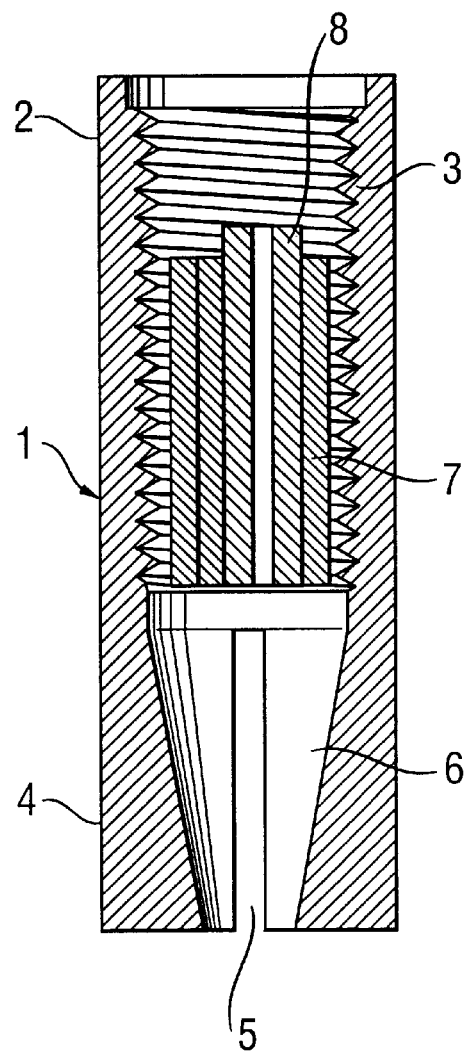
FIG. 1 shows a longitudinal cross-sectional view of an expansion anchor according to the present invention.

An expansion anchor according to the present invention, a first embodiment of which is shown in FIG. 1, includes a sleeve-shaped anchor body 1 having a through-bore 6. In the rear section 2 of the anchor body 1, there is provided load application means 3, e.g., an inner thread. The anchor body 1 has an expansion region 4 in which longitudinal slots 5 are provided. In the embodiment of the expansion anchor shown in FIG. 1, the bore 6 tapers toward the front end of the anchor body 1 in the expansion region 4. A desired shape of the anchor body 1 can be obtained, e.g., by using a cold forming process.

Figure 2:
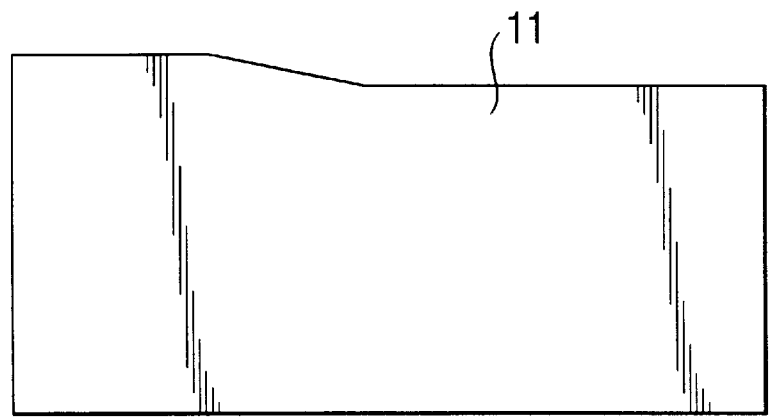
FIG. 2 shows a developed view of the expansion anchor shown in FIG. 1.

An expansion member 7 is provided in the bore 6. The expansion member 7 is formed as a compact, sheet metal stamped part which is designated in FIG. 2 with a reference numeral 11. The expansion member 7 has a substantially cylindrical shape. A tenon 8 projects from the rear end surface of the expansion member 7. The tenon 8 is produced by cutting up the sheet metal stamped part 11, and has, as shown in FIG. 2, a different width along its longitudinal extent. The centered arrangement of the tenon 8 is achieved by starting the rolling of the expansion member 7 at the wider end of the stamped sheet metal part.

For expanding the expansion region 4, the expansion member 7, as per se known, is driven into the tapering region of the bore 6 with axial impacts. The compact rolled expansion member 7 behaves at that as a conventional solid metal part. In particular, because of the compactness of the coils of the sheet material, the expansion member 7 cannot be compressed radially inward.

Figure 3:
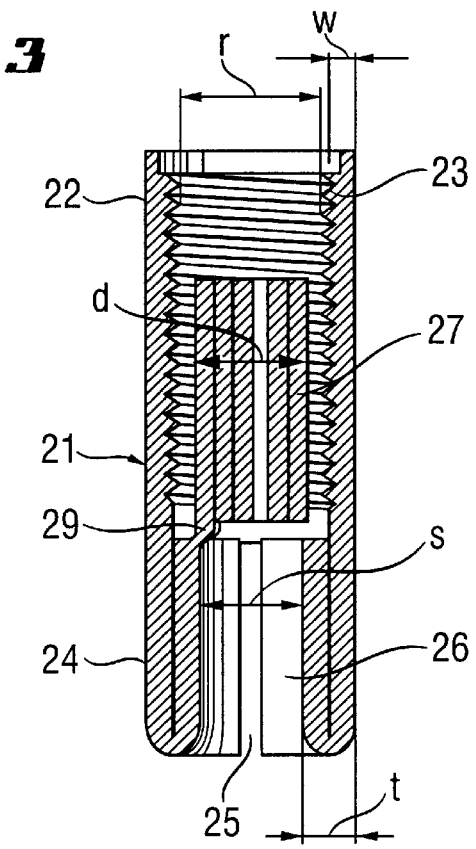
FIG. 3 shows a longitudinal cross-sectional view of another embodiment of an expansion anchor according to the present invention.
Figure 4:
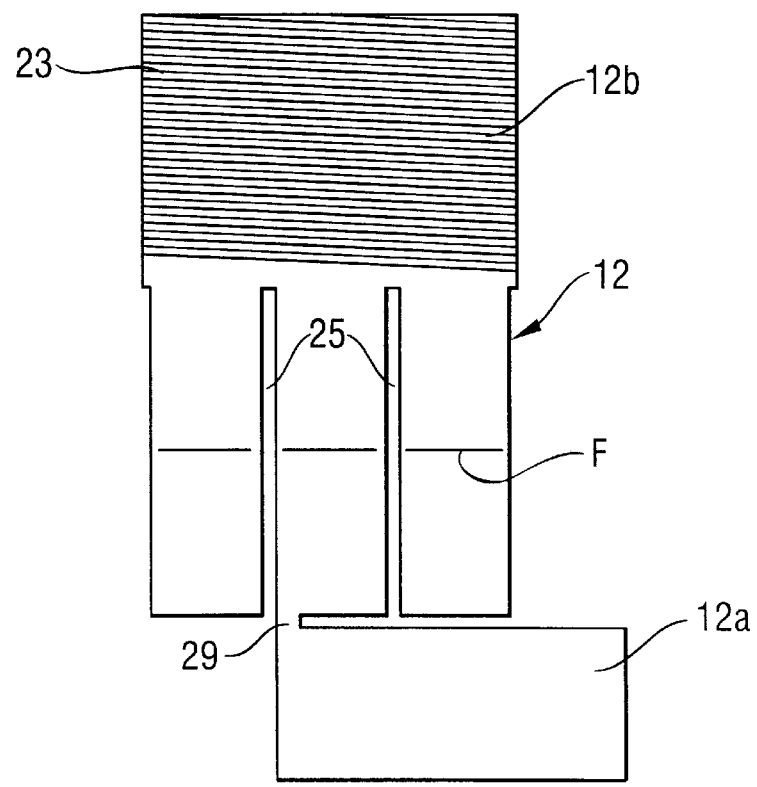
FIG. 4 shows a developed view of the expansion anchor shown in FIG. 3.

FIGS. 3 and 4 show a second embodiment of the expansion anchor according to the present invention. The elements, which are the same as those shown in FIG. 1 or which are similar to those of FIG. 1, are designated with reference numerals increased by 20. Thus, the anchor body, e.g., is designated with a reference numeral 21, the rear section is designated with a reference numeral 22, the inner thread is designated with a reference numeral 23, the expansion region is designated with a reference numeral 24, and the longitudinal slots are designated with a reference numeral 25. The through-bore of the anchor body 21 is designated with a reference numeral 26, and the expansion member is designated with a reference numeral 27. As in FIG. 1, the expansion member 27 also has a substantially cylindrical outer contour. The particularity of the expansion anchor shown in FIGS. 3–4 consists in that the anchor body 21 and the expansion member 7 are formed as a one-piece part and are connected with each other by a predetermined breaking point.

As shown in the developed view of the expansion anchor of FIG. 3, shown in FIG. 4, both the anchor body 21 and the expansion member 27 are formed of a sheet metal stamped part 12. The section 12b of the sheet metal stamped part 2, from which a sleeve-shaped anchor body 21 is formed, has a substantially rectangular shape. The portion of the sheet section 12b, from which subsequently the expansion region 24 is formed, is provided with longitudinal slots 25. In the portion of the sheet section 12b, from which the rear section 22 is formed, the profile of the inner thread 23 is formed, e.g., by impression of or by rolling-in the thread profile. The section of the sheet metal stamped part 12, from which the expansion member 27 is formed, is designated with a reference numeral 12a. The connection region of the two sections 12a and 12b is formed as a predetermined breaking point 29. This connection region can be formed, e.g., by weakening of the material, by perforating it, and the like. The section 12a, from which the expansion element 27 is formed, has a rectangular shape and the same width along its longitudinal extent. As a result, the rolled expansion member 27 has no projecting tenon.

As shown in FIG. 3, the anchor body 21 has, in its expansion region 24, a width t which exceeds the wall thickness w of the rear region 22 provided with the inner thread 23. This is achieved by folding the section 12b of the sheet metal stamped part 12 from which the anchor body 21 is formed. The folding line is designated in FIG. 4 with a letter F. The through-bore 26 has, in the expansion region 24, a cylindrical shape. Due to folding of the sheet material, the bore 26 has, in the expansion region 24, a diameter s which is smaller than the diameter r of the bore 26 in the rear region and is smaller than the outer diameter d of the expansion member 27. Advantageously, the difference between the diameter s of the bore 26 in the expansion region 24 and the diameter d of the expansion member 27 is from about 0.5 mm to about 1.5 mm. With this difference of the diameters r and d, it is insured that the expansion member 27 can be driven into the bore 26 in the expansion region 24, and an adequate radial expansion is achieved.

Figure 5:
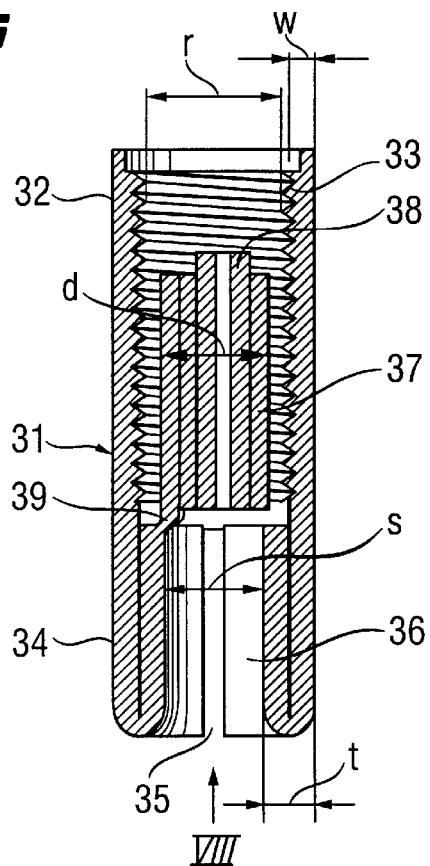
FIG. 5 shows a longitudinal cross-sectional view of a further embodiment of an expansion anchor according to the present invention.
Figure 6:
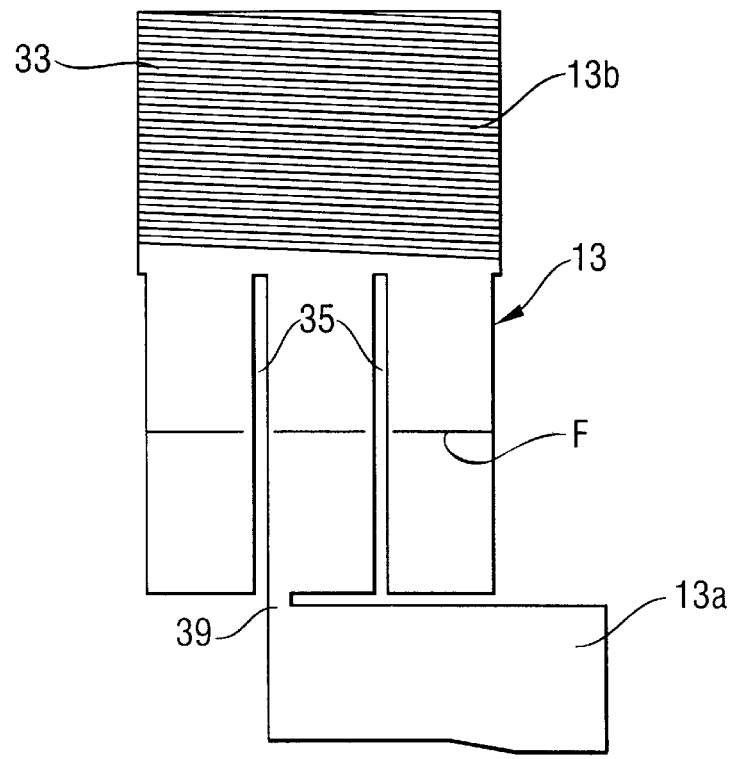
FIG. 6 shows a developed view of the expansion anchor according to FIG. 5.

An expansion anchor according to the present invention, which is shown in FIGS. 5 and 6, is substantially similar to that shown in FIGS. 3 and 4. In FIGS. 5 and 6, the elements which are the same as or similar to the elements of FIGS. 1–4 will be designated with the reference numerals increased by 30. Thus, the anchor body is designated with a reference numeral 36, and so forth. The difference between the expansion anchor shown in FIGS. 5–6 and that shown in FIGS. 3–4 consists in that the expansion number 37 has a tenon 38 which projects from the end surface of the expansion member 37 which is adjacent to the rear section 32 of the anchor body 31. Thus, the shape of the expansion member 37 corresponds to that of the expansion member 7 shown in FIG. 1. FIG. 6 shows a sheet metal stamped part 13 from which the anchor body 31 and the expansion member 37 are formed. The sections of the sheet metal stamped part 13, from which the anchor body 31 and the expansion member 7 are formed, are designated with references numerals 13b and 13a, respectively. The connection region, which defines the predetermined breaking point, is designated with a reference numeral 39.

To form the expansion member 37 with the tenon 38, the rolling of the section 13a starts at the wider end thereof which is opposite the connection region 39.

Figure 7:
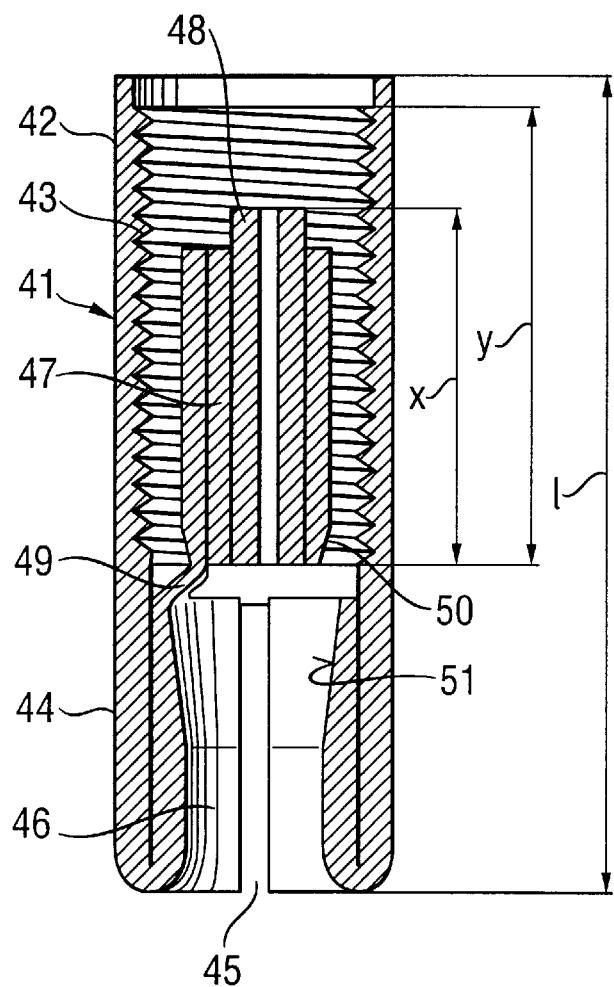
FIG. 7 shows a longitudinal cross-sectional view of a still further embodiment of an expansion anchor according to the present invention.

FIG. 7 shows another embodiment of an anchor according to the present invention. The features or elements of FIG. 7 similar to those of FIGS. 1–6 are designated with same reference numerals increased by 40. Thus, the anchor body is designated with a reference numeral 41, the anchor bore is designated with a reference numeral 46, the expansion member is designated with a reference numeral 47, and so forth. The difference between the embodiment of the anchor shown in FIG. 7 and those shown in FIGS. 1–6, consists in that the bore 46 has, in the transition region between the rear section 42 and the expansion section 44, a cone-shaped slip region 51 for the expansion member 47. The slip region 51 can be obtained, e.g., by stamping of the folded expansion region 44 when the anchor body 41 has not yet been rolled up. Thereby, the bore 46 has a portion the diameter of which is reduced toward the front end. The expansion member 47 can have a cylindrical shape. However, it also can be provided with a tapering front region 50. In an alternative embodiment, not shown in the drawings, the conical region can extend over a longer longitudinal member. Also, the entire expansion member can have a conical shape. The axial length x of the expansion member 47 is equal to the entire length 1 of the anchor body 41 reduced by an axial extent of the inner thread 43.

Figure 8:
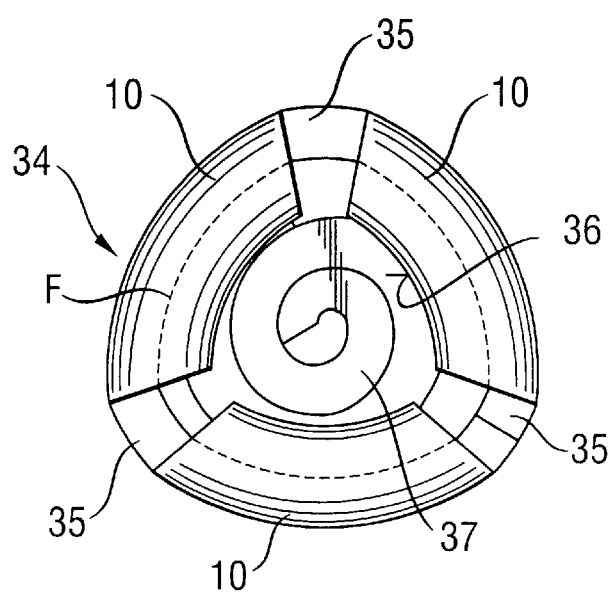
FIG. 8 shows a view of the expansion of the anchor body in the direction of arrow VIII in FIG. 5.

FIG. 8 shows a view of the expansion anchor according to the invention, which is shown in FIG. 5, in the direction of the arrow VIII. Through the bore 36, the front end surface. of the expansion member 37 can be seen. It can be clearly seen, that the expansion region 34 has a substantially triangular shape with convexly curved outer sides. The expansion region 34 is divided by the longitudinal slots 35 in, three expansion sections 10. The folding line F, along which the stamped bent part 12 is folded in the expansion region 34, is shown with dash lines.

The setting process of the expansion anchors, shown in FIG. 3 through FIG. 8, is effected in the same manner as that for the expansion anchor shown in FIGS. 1–2, in per se known way. The anchor body is inserted in a pre-formed bore in a receiving component. Then, the expansion member 27,37,47 is separated from the anchor body 21, 31, 41, respectively, at the predetermined breaking point and is driven into the respective expansion region 24, 34 or 44 by application of axial impacts to a setting tool placed on the expansion member, whereby the expansion region expands, and the anchor is reliably anchored.

Through the present invention was shown and described with references to the preferred embodiments, various modifications thereof will be apparent to those skilled in the art and, therefore, it is not intended that the invention be limited to the disclosed embodiments or details thereof, and departure can be made therefrom within the spirit and scope of the appended claims.

What is claimed is:

1. An expansion anchor, comprising a sleeve-shaped anchor body (1, 21, 31, 41) having a through-bore (6, 26, 36, 46), an expansion region (4, 24, 34, 44) provided with longitudinal slots (5, 25, 35, 45), and a rear section (2, 22, 32, 42) provided with load application means (3, 23, 33, 43); and an expansion member (7, 27, 37, 47) located in the through-bore (6, 26, 36, 46) and axially displaceable in the through-bore (6, 26, 36, 46) for radially expanding the expansion region (4, 24, 34, 44), the expansion member (7, 27, 37, 47) being formed as a sheet metal stamped part (11, 12a, 13a) rolled into a compact body having, at least regionwise, a dimension exceeding a dimension of a portion of the through-bore (6, 26, 36, 46) associated with the expansion region (4, 24, 34, 44).

2. An expansion anchor according to claim 1, wherein the load application means (3, 23, 33, 43) comprises an inner thread.

3. An expansion anchor according to claim 2, wherein an axial length (x) of the expansion member (7, 27, 37, 47) is equal to an entire length (l) of the anchor body (1, 21, 31, 41) reduced by an axial extent of the inner thread (3, 23, 33, 43).

4. An expansion anchor according to claim 1, wherein the expansion member (27, 37, 47) and the sleeve-shaped anchor body (21, 31, 41) are formed as a one-piece part of connected sheet metal stamped parts (12a, 12b, 13a, 13b) a connection region of which defines a predetermined breaking point (29, 39, 49).

5. An expansion anchor according to claim 4, wherein the sleeve-shaped anchor body (21, 31, 41) has, in the expansion region (24, 34, 44) thereof, as a result of folding of the sheet metal stamped part (12b, 13b), a wall thickness (t) which is larger than a wall thickness (w) of the rear section (22, 32, 42) thereof, whereby a diameter (s) of the through-bore (26, 36. 46) in the expansion region (24, 34, 44) is reduced in comparison with a diameter (r) of the through-bore (26, 36, 46) in the rear section (22, 32, 42) of the anchor body (21, 31, 41).

6. An expansion anchor according to claim 5, wherein the through-bore (46) tapers in a setting direction in the expansion region (44).

7. An expansion anchor according to claim 6, wherein tapering of the through-bore (46) in the expansion region (44) is obtained by stamping of folded sections of a sheet metal stamped bent part of which the anchor body (41) is formed.

8. An expansion anchor according to claim 1, wherein the expansion member (7, 27, 37, 47) has a substantially cylindrical profile, and wherein an outer diameter (d) of the expansion member (7, 27, 37, 47) exceeds a diameter (s) of the through-bore (6, 26, 36, 46) in the expansion region (4, 24, 34, 44) by from about 0.5 mm to about 1.5 mm.

9. An expansion anchor according to claim 1, wherein the expansion member (47) has at least a portion (50) thereof tapering in a setting direction.

10. An expansion anchor according to claim 1, wherein a substantially conical slip portion (51) for the expansion member (47) is formed in a transition region of the through-bore (46) between the rear section (42) and the expansion region (44) of the anchor body (41).

11. An expansion anchor according to claim 1, wherein the expansion member (7, 37, 47) has, at a side thereof adjacent to the load application means (3, 33, 43), a substantially centrally projecting tenon (8, 38, 48).

12. An expansion anchor according to claim 1, wherein the anchor body (31) has, in the expansion region (34) thereof, a substantially triangular outer contour with convexly curved outer sides divided by axial slots (35) in three expansion sections (10).

* * * * *